(12) United States Patent
MacKelvie

(10) Patent No.: US 6,830,156 B2
(45) Date of Patent: Dec. 14, 2004

(54) ONE PIECE HANGING FILE

(76) Inventor: Winston Richard MacKelvie, Box 1156, Knowlton, Quebec (CA), J0E 1V0

( * ) Notice: Subject to any disclaimer, the term of this patent is extended or adjusted under 35 U.S.C. 154(b) by 0 days.

(21) Appl. No.: 10/614,561

(22) Filed: Jul. 7, 2003

(65) Prior Publication Data
US 2004/0007544 A1 Jan. 15, 2004

Related U.S. Application Data

(63) Continuation-in-part of application No. 10/177,206, filed on Jun. 21, 2002, now abandoned.

(51) Int. Cl.$^7$ .............................................. A47G 29/00
(52) U.S. Cl. ............................ 211/40; 211/10; 211/46; 211/71.01; 312/183
(58) Field of Search ............................... 211/10, 11, 40, 211/45, 46, 72, 73, 151, 70.1, 85.29, 113; 220/62; 206/312; 40/617, 375, 371; 312/183, 184, 9.53–9.55, 9.9, 9.59

(56) References Cited

U.S. PATENT DOCUMENTS

| | | | | |
|---|---|---|---|---|
| 1,364,667 A | * | 1/1921 | Williams ..................... 312/321 |
| 1,524,348 A | * | 1/1925 | Field ............................ 211/46 |
| 2,207,638 A | * | 7/1940 | Rose, Jr. ................... 273/138.1 |
| 2,325,317 A | * | 7/1943 | Hanna ......................... 211/162 |
| 2,329,201 A | * | 9/1943 | Jonas ........................... 312/184 |
| 2,336,802 A | * | 12/1943 | Posner ......................... 211/162 |
| 2,678,651 A | * | 5/1954 | DeWhaley ................... 211/162 |
| 2,948,402 A | * | 8/1960 | Patterson ..................... 211/40 |
| 3,288,144 A | * | 11/1966 | Hyams ......................... 211/46 |
| 3,365,259 A | * | 1/1968 | Heisman et al. ............ 312/194 |
| 3,642,338 A | * | 2/1972 | Humphrey ................... 312/184 |
| 4,219,247 A | * | 8/1980 | Litchfield et al. ........... 312/184 |
| 4,232,596 A | * | 11/1980 | Kroll et al. .................. 99/410 |
| 4,444,101 A | * | 4/1984 | Weiner et al. ................ 101/35 |
| 4,527,694 A | * | 7/1985 | Bolt et al. ..................... 211/46 |
| 4,765,490 A | * | 8/1988 | Hanson ........................ 211/46 |
| 4,830,268 A | * | 5/1989 | Pitts ............................ 229/67.1 |
| 4,867,319 A | * | 9/1989 | Arner et al. .................. 211/46 |
| 4,958,450 A | * | 9/1990 | Roberg ......................... 40/771 |
| 4,958,728 A | * | 9/1990 | Effendi ....................... 206/425 |
| 4,960,211 A | * | 10/1990 | Bailey ......................... 211/60.1 |
| 5,000,319 A | * | 3/1991 | Mermelstein ............... 206/455 |
| 5,025,979 A | * | 6/1991 | Dellacroce ................. 229/67.2 |
| 5,086,934 A | * | 2/1992 | Kelly ........................... 211/45 |
| 5,187,888 A | * | 2/1993 | O'Brien et al. .............. 40/359 |
| 5,219,216 A | * | 6/1993 | Hassel et al. .............. 312/9.54 |
| 5,226,734 A | * | 7/1993 | Scott et al. ................... 383/22 |
| 5,256,130 A | * | 10/1993 | Kachel et al. ............. 493/210 |
| 5,393,136 A | * | 2/1995 | Grabowski et al. ......... 312/184 |
| 5,545,087 A | * | 8/1996 | Seward .......................... 462/6 |
| 5,553,891 A | * | 9/1996 | Ong ............................. 281/43 |
| 5,725,119 A | * | 3/1998 | Bradford et al. .............. 220/6 |
| 5,758,780 A | * | 6/1998 | Baumgarten .................. 211/46 |
| 5,815,903 A | * | 10/1998 | Foster et al. ............... 29/401.1 |
| 6,182,825 B1 | * | 2/2001 | Butcher ..................... 206/308.1 |
| 6,189,689 B1 | * | 2/2001 | Toussaint ................. 206/308.3 |
| 6,227,746 B1 | * | 5/2001 | Long et al. ................... 402/4 |
| 6,332,285 B1 | * | 12/2001 | Aaldenberg et al. .......... 40/641 |
| 2004/0011682 A1 | * | 1/2004 | Hasemi ....................... 206/307 |

* cited by examiner

Primary Examiner—Carl D. Friedman
Assistant Examiner—Jennifer E. Novosad

(57) ABSTRACT

A one piece hanging file made from a continuous web of a flexible sheet material. In one embodiment, small loops are heat-welded at intervals along the strip creating channels or hems for removable hangers. Larger loops between the channels become the file pockets. In another embodiment spring clips clamp small loops of the strip and have notched overhanging ends to engage the support rails. In another embodiment, laminated film is welded directly to the edges of the hanger strips. In all embodiments the filed objects, such as compact discs, rise smoothly out of the looped file pocket when a hanger is lifted. In all embodiments, an opening or aperture made in the center of the looped bottom prevents round media such as CDs from accidentally rolling out of the pocket.

18 Claims, 4 Drawing Sheets

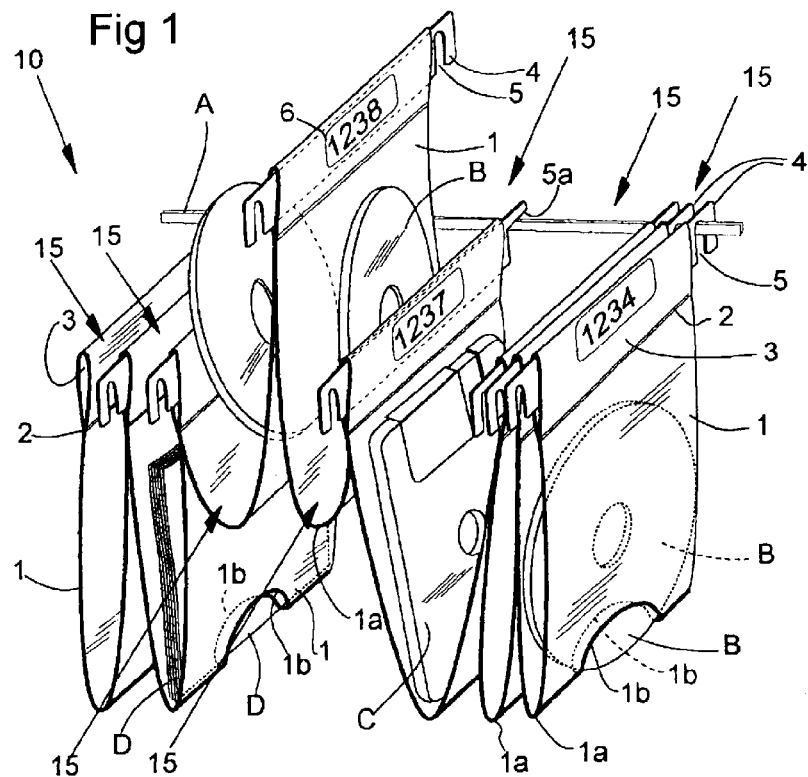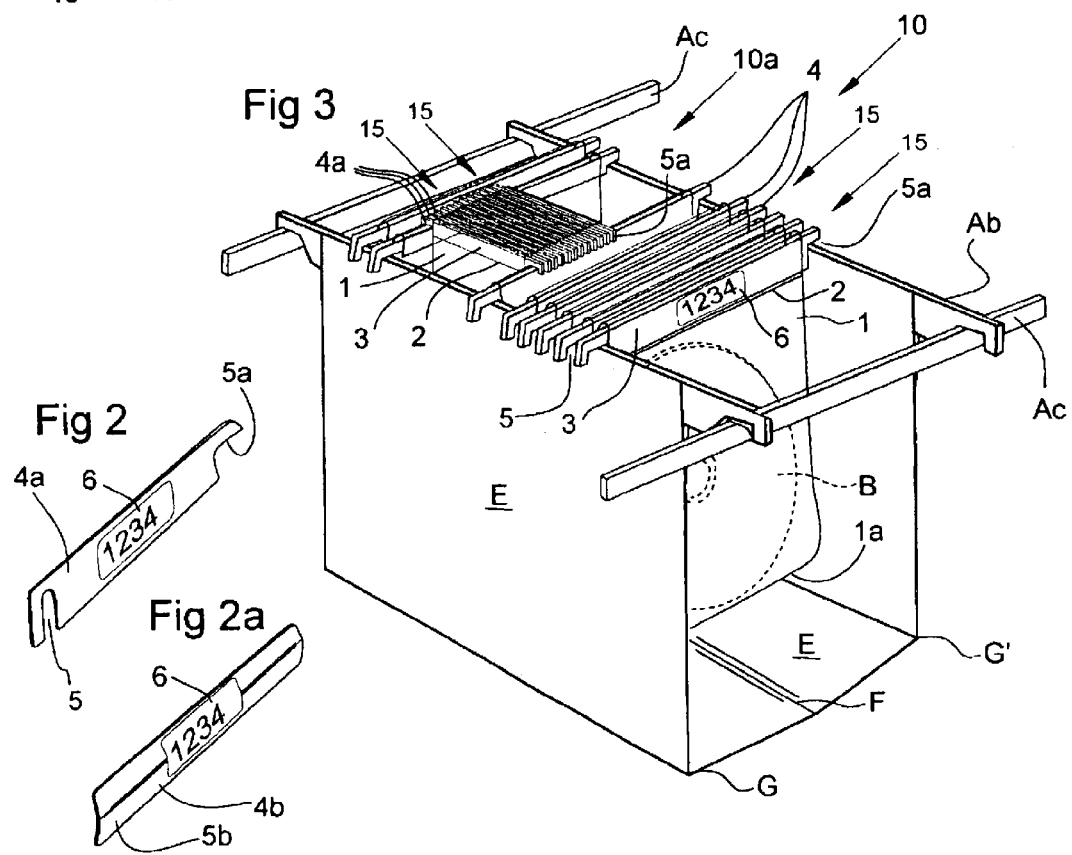

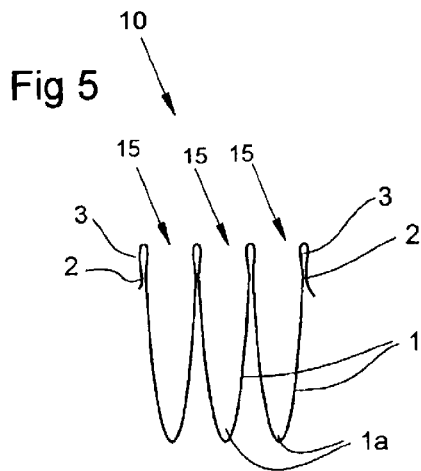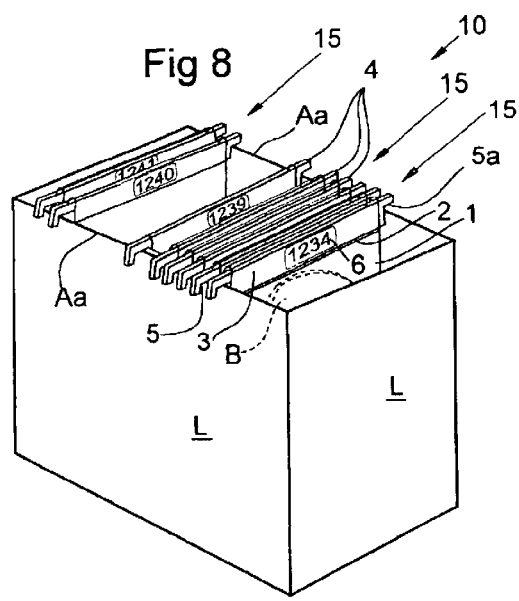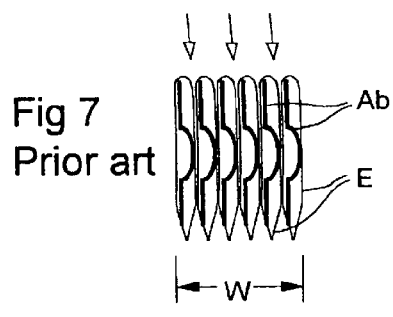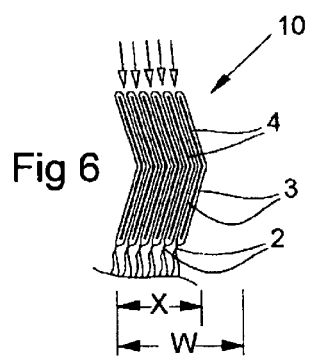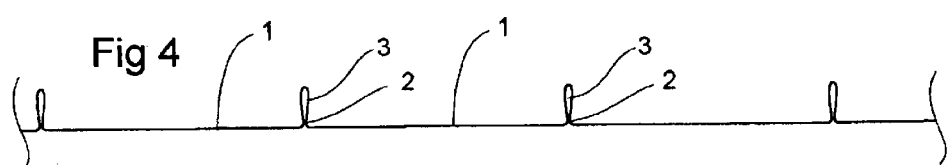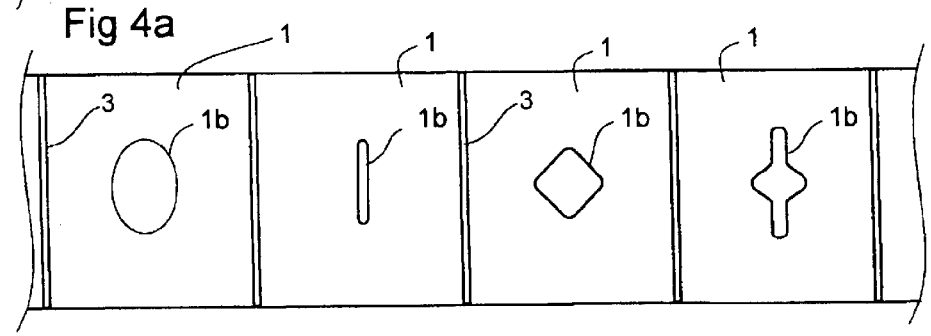

ONE PIECE HANGING FILE

FIELD OF THE INVENTION

This Application is a continuation in part of Application 10/177,206 filed Jun. 21, 2002, now abandoned. The present invention is in the field of filing systems, and more particularly, the hanging file folder systems that ride on support rails in a file drawer, box, or filing cabinet.

BACKGROUND OF THE INVENTION

Hanging file folders made of stiff material with metal margin supports and sharp creased bottom folds are in common use. The sharp crease fold at the bottom prevents the thin paper held in the folder from curling at the bottom and collapsing down into a roll. When the material to be filed is itself stiff and light such as compact disks, computer disks, and cards, a less expensive method of construction is called for.

The present invention uses a continuous web of a flexible sheet material looped into file pockets that use a shared hangers between every two pockets. The hangers which separate the file pockets may be written on or a separate label strip may be attached. By lifting the hanger, the contents of the file are raised smoothly from the looped bottom of the file pocket allowing for easy viewing and removable. In addition, in the case of CDs and DVDs, the disc's center hole comes up out of the pocket for safer handling. An aperture or opening through the file pocket's lower loop serves to locate a disc shape and prevent its rolling out of the pocket. This method of construction reduces the cost and bulk of hanging files making them practical for smaller media such as business cards, CD-ROMs, DVDs, diskettes, cassettes, booklets, stamps, and the like.

SUMMARY OF THE INVENTION

In the present invention, hanging files can be made small enough to fit crosswise in an a existing hanging file folder and even smaller ones can be made to hang crosswise in it. Such miniature hanging files may be made from a continuous web of a flexible sheet material preferably a heat-weldable plastic film such as a laminate of nylon-polyethylene. Along the length of the film, at regular spacing, a small amount of the plastic film, say one inch, is folded and welded to create a one half inch wide hem or channel. A one half inch wide hanger wider than the strip and having end notches slips through the channel. The distance between the channel welds defines the file pocket depth. The bottom of the pocket may be left in a loop shape, or creased, as required. A centered hole or aperture in the bottom of each file pocket engages the circumference of a CD to thereby restrain it from rolling from side to side in the pocket.

The metal hangers of existing file folder hangers are often stiffened along their length by forming a crease or recess. This adds to overall file thickness since the stiff cardboard of the file pocket cannot conform to this crease. The present invention takes up less space because the flexible plastic film will conform to any cross-sectional shape given to the hangers. When the media held in the present hanging file is small like CDs, the crease in the hanger is not required making for an even thinner overall file package.

With the present invention, any individual file's contents can be inspected and removed by lifting the hanger which causes the contained media to slide smoothly upwards from the rounded or looped bottom of the file pocket. Upon releasing the hanger, the weight of the adjacent file's contents causes the selected file pocket to fall back down into place.

BRIEF DESCRIPTION OF THE DRAWINGS

FIG. 1 A perspective view of a one embodiment with hole in bottom of pocket loop;

FIG. 2 A perspective view of a removable hanger;

FIG. 2a A perspective view of another hanger;

FIG. 3 A perspective view of a first smaller set of hanging files hangs crosswise within a larger hanging file and a second even smaller set hanging crosswise within the first set;

FIG. 4 An edge or side view of a section of the strip of plastic film with welded hems or at regular intervals;

FIG. 4a is a plan view of the strip of plastic film with hems or channels and disc locator holes;

FIG. 5 An edge view showing how the file pockets fall between the hems;

FIG. 6 An end view of several nested hems portions with creased hangers therein showing the compaction made possible by using thin plastic film for a set of five separate file pockets;

FIG. 7 The same channel view but of prior art hanging file folders showing the bulk created by the stiff pocket material, and, how fewer folders take up more space.

FIG. 8 shows a perspective of a shipping box that doubles as a hanging file holder;

DETAILED DESCRIPTION OF THE INVENTION

Figure 9:
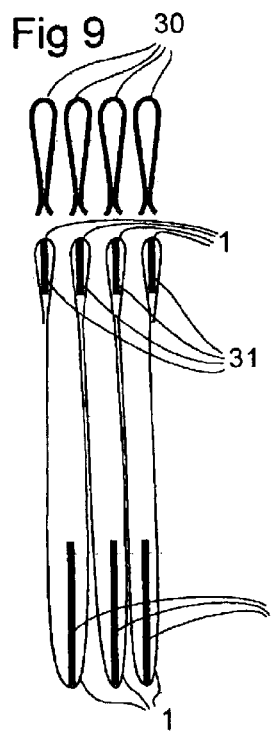
FIG. 9 shows another embodiment where a separate clip is used to act as a hanger and to hold the file pocket without welding, and where the material from which the file is to be made is draped accordion style about fixed forming blades and where the top blades hold the material as the separate clip-hanger is forced down into position.
Figure 10:
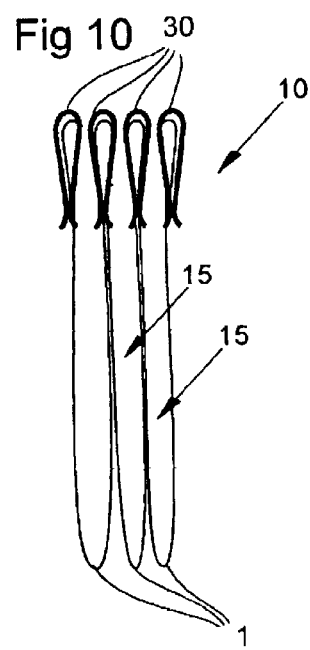
FIG. 10 is the same embodiment in an assembled form with the hanger-clip in position and the assembled file removed from the forming blades.
Figure 11:
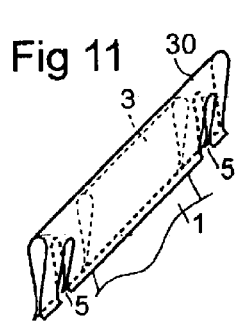
FIG. 11 is a perspective on the hanger-clip showing the notches at each end.
Figure 12:
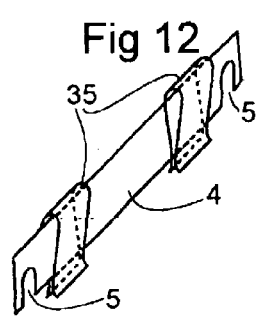
FIG. 12 is another embodiment where a separate hanger with end notches is held in the material's channel by two separate clips.

In FIG. 1 is shown a perspective of a hanging file 10 having several individual file pockets 15 made according to the present invention. Hanging file 10 may be made in different sizes to accommodate larger and smaller items to be filed. Regardless of the size, hanging file 10 is made from a continuous web of a flexible sheet material 1 which, in one embodiment, has narrow hems or channels 3 created at intervals by joints 2. If material 1 is a plastic film, it may advantageously be transparent. The joints 2 may be made, for example, by ordinary heat welding, radio frequency sealing, or by sewing. Between adjacent channels a larger amount of material 1 forms file pockets 15 having smoothly rounded bottom 1a. Channels 3 accept removable hanger strips 4 to ride on parallel rails A (only one rail shown in FIG. 1). Rails A may be separate metal or plastic pieces or they may be the top edges of the sides of a box or shipping container or other open-topped tray.

Figure 13:
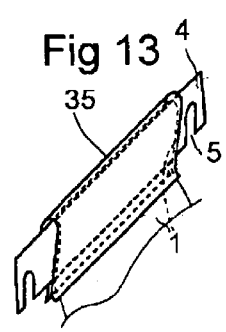
FIG. 13 is the same where the clip is full length.
Figure 13A:
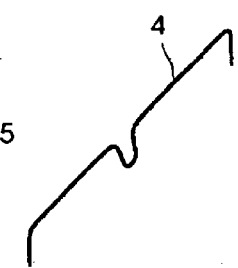
FIG. 13a shows a hanger made of bent wire whose end bends locate on the file's support rails.
Figure 14:
FIG. 14 shows an enlarged view of the hanger-clip and clip structure where the opposing clamping areas have serrations running lengthwise to better secure the material.
Figure 14A:
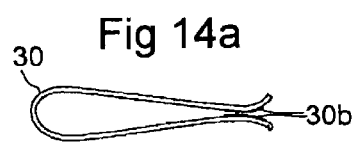
FIG. 14a is the same with a friction material at the clamping areas.

FIGS. 9–14a shows another embodiment where the plastic film 1 is clamped by various configurations of spring clips 30, 35 instead of welding. Made of stiff plastic such as polycarbonate or of sheet metal, spring clip 30 shown in FIG. 11 may have notches at each outboard end to engage support rails. Spring clips 35 in FIG. 12 trap a separate hanger as well as the plastic film (film not shown). In FIG. 13 the clip is one piece trapping separate hanger 4 and plastic film 1. In FIG. 13a is shown a least expensive hanger 4 of bent wire with downward ends and where a center bend prevents the wire from rotating out of position in the clip. FIG. 9 shows how the strip of material 1 has been draped about a fixture of upper and lower blades 31 and 32 whose relative vertical spacing establishes the file pocket depth dimension. The hanger-clips 30, one for each upper blade (only four are shown here), are pressed over the material 1 supported by blades 31 such that the finished assembly of file 10 with pockets 15 can be slid off the blades 31, 32. FIGS. 14 and 14a show another embodiments of the clip 30 where barbs 30a or sticky media 30b are part of clip 30 to ensure a non-slip grip on material 1.

Figure 15:
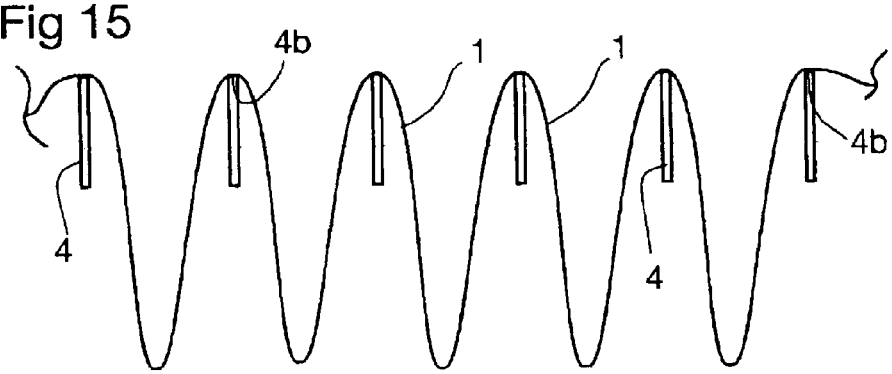
FIG. 15 shows a side or edge view of another embodiment where the individual hangers and the strip of laminated plastic film are in a position to be edge welded together.
Figure 16:
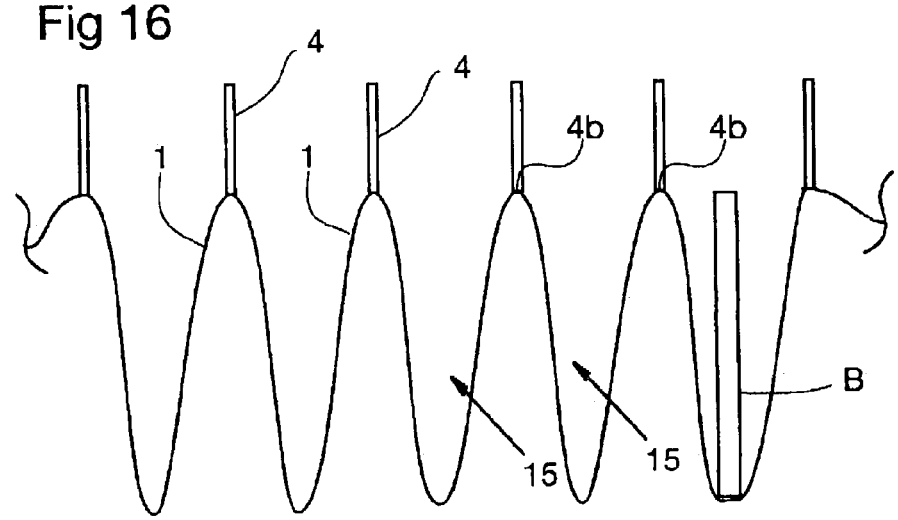
FIG. 16 is the same embodiment flipped over into use position so that the hangers are on top and the plastic film has formed the looped file pockets therebetween and where one file pocket has an article held therein.
Figure 17:
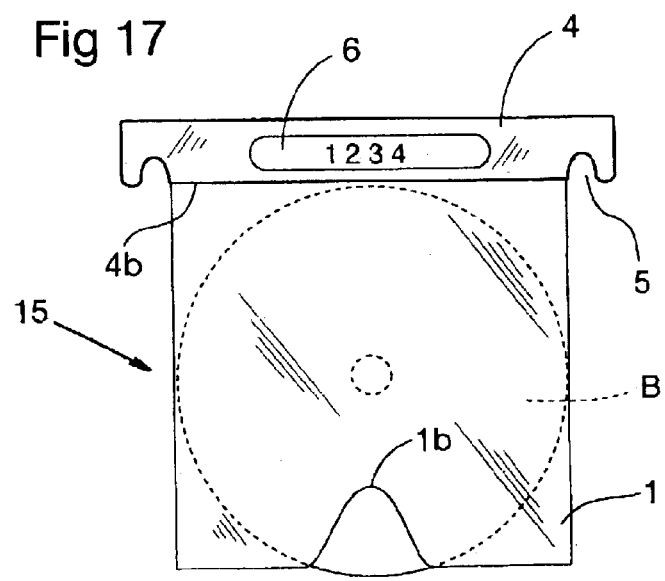
FIG. 17 is the same embodiment viewed from the front and showing a circular article located in the opening at the pocket bottom.

FIGS. 15–17 show another embodiment of the present invention where the hanger 4 having edge 4b is welded directly to plastic film 1. Ideally film material 1 is a laminate with one side being of the same plastic family as the hanger 4 (such as polyethylene) and the other side being of a higher melting point plastic (such as Nylon®). FIG. 15 shows a row of hangers 4 having the plastic film 1 draped over them. Heating the film on the Nylon® side at edge surface 4b welds the polyethylene side to the hanger's edge 4b. FIG. 16 shows that by flipping over the welded assembly of FIG. 15, the hangers 4 become uppermost while pockets 15 fall therebetween. In FIG. 17 a front view of this embodiment shows pocket 15 welded to hanger 4 along edge 4b and having opening or aperture 1b. Media B is shown to be a disc with its lowermost portion extending slightly through aperture or opening 1b 15. A label 6 may be attached to hanger 3 or hanger 3 may be written directly on.

In all embodiments, by lifting hanger 4 of any file, the two adjacent file pockets are made to rise which causes pocket bottom 1a to rise and media B to slide smoothly up out of the pocket for ready access. As shown in FIGS. 1 and 4a, the looped bottom 1a of material 1 can have an aperture or opening 1b of appropriate shape. This opening 1b enables the lowermost edge of round media such as a compact disc B to partially drop through the centered opening 1b and thereby be anchored or located to prevent it from rolling from side to side and possibly out of the pocket 15.

FIGS. 1, 2 and 2a show removable hangers 4, 4a, and 4b which may have different cross sectional shapes such as the flat strip of 4 and 4a in FIGS. 1 and 2 and the creased strip 4b in FIG. 2a. Hangers 4, 4a have end notches 5 or 5a to locate on rails A or Ab or box edge Aa, or, hanger 4b may have no notches as shown by plain end 5b in FIG. 2a. Other shapes of notches are possible. Supports or rails A may be metal strips added for the express purpose of support, or may be the hangers of another hanging file such as the hangers 4, 4a, and 4b of the present invention or those hangers Ab of existing hanging file folders E which in turn are supported by rails Ac.

In FIG. 3 are shown three different size hanging files nested together. The two smaller versions of the present hanging file 10, 10a are shown nested in the largest one which is shown to be a standard hanging file folder E, although this could just as well be a box or some channel-shaped container or tray. Largest file folder E in FIG. 3 may also be a hanging file according to the present invention. In this way in a file cabinet drawer, one of many full-sized hanging file E could have a smaller sized hanging file 10 of the present invention sitting crosswise in it and holding CDs B which, in turn, holds a smaller hanging file 10a crosswise for business cards. Thus a wide range of media may be held in a single drawer providing ready access, compact storage, and security.

If material 1 is transparent, FIGS. 1, 2 and 3 shows how channels 3 and removable hangers 4 work together to hold and display an index label 6 which may be simply slipped into the channel 3 or the label information may be written directly on hanger 4. If material 1 is an opaque fabric then the exterior surface of channel 3 may be written directly on for the labeling.

FIG. 4, shows an edge view of one embodiment where hems or channels 3 are formed by welds 2 in material 1. In FIG. 4a is a plan or top view of this embodiment further showing disc locator holes 1b in a range of possible shapes.

In place of heat welding plastic to make joints 2, the present invention may be carried out using using glue, staples, tape, or stitching to create joints 2 in a variety of materials including fabric, web, paper or other flexible materials.

In FIG. 7 is shown the prior art method of manufacturing hanging file folders where formed or creased metal strip supports Ab are within a channel of stiff material E. This makes for a minimum compressed thickness W for three file pockets as shown by the three arrows. In FIG. 6 the present method of manufacture shows five file pockets as shown by arrows which nest to thickness X. Thickness X is shown to be much less than thickness W of the prior art.

Additional folds G and G' (FIG. 3) provide straight sides for smaller hanging files 10 to fit better in a standard file folder. Although FIG. 3 shows the supporting file folder E as being a complete file folder, it could be split in two along the bottom crease, or, it could even have no sides, or, only the rails A themselves cut from the cardboard sides.

FIG. 8 shows shipping box L with the lid removed and showing how hanging file 10 can serve as retail packaging for CDs disks B where the top edges Aa of box L serve as rails. CDs B may also be in thin or regular jewel cases (not shown).

I claim:

1. In combination, a hanging file system and a plurality of disc shaped members, said hanging file system comprising:
   a container having a pair of parallel rails extending between opposed sides thereof;
   a continuous web of a flexible sheet material having a pair of opposed side marginal edges;
   hanger strips supporting said web at regular intervals and having end portions extending beyond respective side marginal edges of said web, said end portions being supported by said parallel rails; and a plurality of file pockets being formed by portions of said web between said hanger strips, each file pocket having a first sidewall, a second sidewall and a bottom portion, an aperture being formed in each of said bottom portions, each of said apertures being spaced substantially equally from each of said side marginal edges such that each of said disc shaped members is retained in position within a file pocket by said apertures formed in said bottom portions.

2. The hanging file system of claim 1 wherein each of the apertures has a configuration selected from generally circular and generally elliptical configurations.

3. The hanging file system of claim 1 wherein each of the hanger strips has a notch formed in an underside of said end portions, said notches seating on respective ones of said parallel rails.

4. The hanging file system of claim 1 wherein said web of flexible material comprises a web of transparent plastic film.

5. The hanging file system of claim 1 further including labeling means on each of said hanger strips.

6. The hanging file system of claim 1 wherein said pair of parallel rails are formed by upperside marginal edges of said container.

7. A hanging file system comprising:

a container having a pair of parallel rails extending between opposed sides thereof; a continuous web of a flexible sheet material having a pair of opposed side marginal edges; said web being sealed to itself at regular spaced intervals to thereby provide a plurality of channels extending between said pair of opposed side marginal edges, said channels being open at said opposed side marginal edges, a hanger strip mounted within each of said channels, each of said hanger strips having end portions extending beyond respective side marginal edges of said web, said end portions being supported by said parallel rails; and a plurality of file pockets being formed by portions of said web between said channels, each file pocket having a first sidewall, a second sidewall and a bottom portion, an aperture being formed in each of said bottom portions, each of said apertures being spaced substantially equally from each of said side marginal edges.

8. The hanging file system of claim 7 wherein the hanger strips are removably mounted within said channels.

9. The hanging file system of claim 7 wherein each of the apertures has a configuration selected from generally circular and generally elliptical configurations.

10. The hanging file system of claim 7 wherein each of the hanger strips has a notch formed in an underside of said end portions, said notches seating on respective ones of said parallel rails.

11. The hanging file system of claim 7 wherein said web of flexible material comprises a web of transparent plastic film.

12. The hanging file system of claim 7 further including labeling means on each of said hanger strips.

13. The hanging file system of claim 7 wherein said pair of parallel rails are formed by upperside marginal edges of said container.

14. The hanging file system of claim 7 wherein said web is sealed to itself by heat sealing.

15. A hanging file structure for use with parallel rails, the hanging file structure comprising:

a continuous web of a flexible sheet material having a pair of opposed side marginal edges;

hanger strips supporting said web at regular intervals and having end portions extending beyond respective side marginal edges of said web, whereby the hanger strips are adapted to be supported by the rails; and a plurality of file pockets being formed by portions of said web between said hangers, each file pocket having a first sidewall, a second sidewall and a bottom portion, an aperture being formed in each of said bottom portions, each of said apertures being spaced substantially equally from each of said side marginal edges.

16. The hanging file structure of claim 15 wherein each of the apertures has a configuration selected from generally circular and generally elliptical configurations.

17. The hanging file structure of claim 15 wherein said web of flexible material comprises a web of transparent plastic film.

18. The hanging file system of claim 15 wherein each of the hanger strips has a notch formed in an underside of said end portions.

* * * * *